United States Patent
Suzuki et al.

(10) Patent No.: US 6,917,239 B2
(45) Date of Patent: Jul. 12, 2005

(54) LEVEL SHIFT CIRCUIT AND SEMICONDUCTOR DEVICE

(75) Inventors: Hisao Suzuki, Kasugai (JP); Katuyuki Yasukouchi, Kasugai (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 09/816,133

(22) Filed: Mar. 26, 2001

(65) Prior Publication Data

US 2002/0047740 A1 Apr. 25, 2002

(30) Foreign Application Priority Data

| Oct. 24, 2000 | (JP) | ................................. 2000-323924 |
| Dec. 22, 2000 | (JP) | ................................. 2000-390553 |

(51) Int. Cl.[7] ................ G05F 1/10; G05F 3/02
(52) U.S. Cl. ..................... 327/536; 327/333
(58) Field of Search ................ 327/333, 309, 327/536, 537, 589, 390; 326/63, 80, 81; 307/110

(56) References Cited

U.S. PATENT DOCUMENTS

| 613,556 | A | * | 11/1898 | Brown | ............... 368/236 |
| 4,000,412 | A | | 12/1976 | Rosenthal et al. | ............... 327/180 |
| 4,612,462 | A | * | 9/1986 | Asano et al. | ............... 326/107 |
| 5,917,348 | A | * | 6/1999 | Chow | ............... 327/108 |
| 5,933,028 | A | * | 8/1999 | Kushiyama | ............... 326/68 |
| 5,940,283 | A | | 8/1999 | Mihara | ............... 363/60 |
| 6,060,930 | A | * | 5/2000 | Choi | ............... 327/276 |
| 6,091,351 | A | | 7/2000 | Shimomura | ............... 341/155 |
| 6,198,334 | B1 | * | 3/2001 | Tomobe et al. | ............... 327/391 |
| 6,222,384 | B1 | | 4/2001 | Kim | ............... 326/68 |
| 6,433,623 | B1 | * | 8/2002 | Okutsu et al. | ............... 327/543 |

FOREIGN PATENT DOCUMENTS

| DE | 2525057 | 12/1976 |
| DE | 3638957 | 5/1988 |
| DE | 4139762 | 6/1993 |
| DE | 19834428 | 2/2000 |
| DE | 19842458 | 7/2000 |
| DE | 19825034 | 4/2001 |
| JP | 10144080 A | * 5/1998 | ......... G11C/11/413 |

* cited by examiner

*Primary Examiner*—Quan Tra
(74) *Attorney, Agent, or Firm*—Arent Fox PLLC

(57) ABSTRACT

A level shift circuit including a capacitor, a charge control circuit, and a limiting circuit. The charge control circuit is connected to the capacitor to provide the voltage of a high potential power supply to the capacitor and to control the charging of the capacitor. The limiting circuit is connected to the high potential power supply and the charge control circuit to limit the voltage provided to the capacitor from the high potential power supply before the charge control circuit stops providing the voltage of the high potential power supply to the capacitor.

11 Claims, 8 Drawing Sheets

LEVEL SHIFT CIRCUIT AND SEMICONDUCTOR DEVICE

BACKGROUND OF THE INVENTION

The present invention relates to a level shift circuit and a semiconductor device. More particularly, the present invention pertains to a level shift circuit for converting a voltage level of an input signal to a predetermined voltage level and outputting the converted signal. The present invention also pertains to a semiconductor device incorporating such a level shift circuit.

Contemporary semiconductor integrated circuit devices have multiple functions. Such devices require a low power supply voltage and multiple power supplies. Thus, an interface circuit of a semiconductor device includes a level shift circuit, such as a charge pump circuit.

FIG. 1 is a schematic circuit diagram of a prior art level shift (charge pump) circuit 100. FIG. 2 is a chart illustrating the waveform of the charge pump circuit 100.

As shown in FIG. 1, the chart pump circuit 100 includes a first inverter 12, a second inverter 11, a pumping capacitor C1, and a p-channel MOS (PMOS) transistor Q1. The charge pump circuit 100 provides its input signal VIN to the capacitor C1 and generates an output signal VOUT, whose voltage is higher than that of the input signal VIN.

The second inverter 11 receives the input signal VIN and is connected to a high potential power supply VD and a low potential power supply (ground) GND. The output terminal of the second inverter 11 is connected to the low potential power supply terminal of the first inverter 12.

The high potential power supply terminal of the first inverter 12 is connected to the high potential power supply VD via the PMOS transistor Q1, which prevents current from flowing in the reverse direction. The capacitor C1 is connected between the high potential and low potential power supply terminals of the first inverter 12. The first inverter 12 receives a voltage VH from the high potential power supply VD and generates an output signal VOUT in correspondence with the value of the high potential voltage VH.

When the voltage of the input signal VIN is equal to the high potential voltage VH, the level of a voltage of the output signal of the second inverter 11, or a first inverter voltage V1, is equal to the GND level (0V). Since the first inverter 12 is provided with the high potential power supply VD, the voltage of the output signal VOUT of the first inverter 12 is equal to the GND level. In this state, the gate of the PMOS transistor Q1 receives the output signal VOUT at the GND level. This activates the PMOS transistor Q1.

The activated PMOS transistor Q1 charges the capacitor C1 by way of the high potential power supply VD. Thus, a voltage V2 at node ND1 between the PMOS transistor Q1 and the capacitor C1 increases to the level of the high potential voltage VH.

With reference to FIG. 2, the voltage of the input signal VIN shifts to the GND level at time t0. This shifts the first inverter voltage V1 from the GND level to the high potential voltage VH level. The first inverter voltage V1 then increases the charge voltage of the capacitor C1 to a level corresponding to the high potential voltage VH. Thus, the node voltage V2 becomes two times greater than the high potential voltage VH (i.e., 2VH). The first inverter 12 functions in correspondence with the voltage V1 (VH) provided to its low potential power supply terminal and the voltage V2 (2VH) provided to its high potential power supply terminal.

Thus, the first inverter 12 receives the high potential voltage VH and generates the output signal VOUT having voltage V2 (2VH) at time t1 (FIG. 2). In this state, the output signal VOUT having voltage V2 (2×VH) is provided to the gate of the PMOS transistor Q1. This deactivates the PMOS transistor Q1.

When the voltage of the input signal VIN shifts from the high potential voltage VH to the GND voltage and the first voltage V1 increases to the level of the high potential voltage VH, the capacitor C1 increases the node voltage V2. Referring to FIG. 2, when the node voltage V2 increases, the shifting of the output signal VOUT is delayed by a time required for the first inverter 12 to function.

In other words, when the node voltage V2 shifts to the 2VH level, the PMOS transistor Q1 is still activated. Thus, charge leaks from the capacitor C1 toward the high potential power supply VD via the transistor Q1. This decreases the rising speed of the node voltage V2. As a result, the voltage shifting speed (i.e., the speed of response to the input signal VIN) of the output signal VOUT decreases.

In the aforementioned prior art device, the capacitor C1 has a large capacitance to counteract the decrease in the response speed. The large capacitance of the capacitor C1 has a sufficient margin with regard to the leak of charge from the capacitor C1 to the high potential power supply VD. Thus, the leak of charge from the capacitor C1 to the high potential power supply VD is largely inconsequential. However, when incorporating the charge pump circuit 100 in a semiconductor integrated circuit, it is difficult to arrange a large capacitor C1 on a semiconductor chip.

Another prior art level shift circuit 200 will now be described. FIG. 3 is a circuit diagram of the level shift circuit 200. As shown in FIG. 3, the level shift circuit 200 includes an input circuit 51 and a shift circuit 52.

The level shift circuit 200 is connected to a first power supply VD1, a second power supply GND, and a third power supply VD3. The level shift circuit 200 receives an input signal IN having the voltage of the third power supply VD3 (third voltage VL) and generates an output signal OUT having the voltage of the first power supply VD1 (first voltage VH). The third voltage VL is set at 1.0V, and the first voltage VH is set at 3.0V.

The input circuit 51 is connected between the third power supply VD3 and the second power supply GND (ground GND). Further, the input circuit 51 includes an n-channel MOS (NMOS) transistor Q34 and a PMOS transistor Q35.

The input circuit 51 inverts the input signal IN to generate an inverted input signal /IN and provides the inverted input signal /IN to the shift circuit 52. The shift circuit 52 receives the input signal IN and the inverted input signal /IN and generates the output signal OUT based on the two signals IN, /IN.

The shift circuit 52 includes a first NMOS transistor Q36, a second NMOS transistor Q37, a first PMOS transistor Q38, and a second PMOS transistor Q39.

The gate of the first NMOS transistor Q36 receives the inverted input signal /IN, and the gate of the second NMOS transistor Q37 receives the input signal IN. In other words, the gates of the first and second NMOS transistors Q36, Q37 receive two complementary signals. The sources of the first and second NMOS transistors Q36, Q37 are connected to the ground GND, and the drains of the NMOS transistors Q36, Q37 are respectively connected to the drains of the PMOS transistors Q38, Q39.

The gate of the first PMOS transistor Q38 is connected to the drain of the second PMOS transistor Q39, and the gate of the second PMOS transistor Q39 is connected to the drain of the first PMOS transistor Q38. The sources of the PMOS transistors Q38, Q39 are connected to the first power supply VD1.

When the level shift circuit 200 receives the input signal IN at the third voltage VL (1.0V), the first NMOS transistor Q36 is deactivated and the second NMOS transistor Q37 is activated. In this state, the first PMOS transistor Q38 is activated, and the second PMOS transistor Q39 is deactivated. Accordingly, the shift circuit 52 generates the output signal OUT at the first voltage VH (3.0V).

When the level shift circuit 200 receives the input signal IN at the GND level (0V), the level shift circuit 200 activates the first NMOS transistor Q36 and deactivates the second NMOS transistor Q37. In this state, the second PMOS transistor Q39 is activated, and the first PMOS transistor Q38 is deactivated. Accordingly, the shift circuit 52 generates the output signal OUT at the GND level (0V).

The first and second NMOS transistors Q36, Q37 are activated and deactivated by the input signal IN at a low voltage. That is, the threshold voltage for activating and deactivating the first and second NMOS transistors Q36, Q37 is low. Accordingly, transistors having a low withstand voltage are used as the transistors Q36, Q37.

FIG. 4 is a graph showing the relationship between the gate-source voltage VGS and the drain current ID in two transistors having different withstand voltages. In FIG. 4, curve A illustrates the characteristic of a transistor having a low withstand voltage (hence, a low withstand voltage device), and curve B illustrates the characteristic of a transistor having a high withstand voltage (hence, a high withstand voltage device).

As apparent from curves A and B in FIG. 4, the threshold voltage for activating the low withstand voltage device is about one half the threshold voltage for deactivating the high withstand voltage device. Accordingly, the first and second NMOS transistors Q36, Q37 are activated and deactivated at a lower gate-source voltage in comparison with a high withstand voltage device.

However, the drain of the first NMOS transistor Q36 receives the first voltage VH (3.0V) via the activated PMOS transistor Q38. In this state, the source-drain voltage of the first NMOS transistor Q36 may exceed its threshold voltage. This decreases the reliability of the first NMOS transistor Q36. The same problem also occurs with the second NMOS transistor Q37.

SUMMARY OF THE INVENTION

It is an object of the present invention to provide a charge pump circuit that has a quick response and satisfactory step up efficiency.

It is a further object of the present invention to provide a level shift circuit that improves the reliability of low withstand voltage transistors employed for level shifting.

To achieve the above objects, the present invention provides a level shift circuit including a capacitor, a charge control circuit connected to the capacitor for providing the voltage of a high potential power supply to the capacitor and controlling charging of the capacitor, and a limiting circuit connected to the high potential power supply and the charge control circuit for limiting the voltage provided to the capacitor from the high potential power supply before the charge control circuit stops providing the voltage of the high potential power supply to the capacitor.

The present invention further provides a level shift circuit for converting a voltage level of an input signal to a predetermined voltage level and generating a level-shifted signal. The level shift circuit includes a capacitor having a first electrode connected to a high potential power supply and a second electrode for receiving the input signal. A charge control circuit is connected to the first electrode of the capacitor for providing the voltage of the high potential power supply to the capacitor and controlling charging of the capacitor. A first inverter receives the voltage of the high potential power supply and generates the level-shifted signal. The first inverter circuit includes a high potential power supply terminal connected to the first electrode of the capacitor and a low potential power supply terminal connected to the second electrode of the capacitor. A current limiting circuit is connected to the charge control circuit for limiting the discharge current of the capacitor.

The present invention also provides a level shift circuit including a shift circuit for receiving an input signal and level-shifting the voltage of the input signal to generate a level-shifted signal. The shift circuit includes first and second transistors having the same polarity. The sources of the first and second transistors are connected to a first power supply having a first voltage. The gate of the first transistor is connected to the drain of the second transistor, and the gate of the second transistor is connected to the drain of the first transistor. The shift circuit further includes third and fourth transistors each having a polarity opposite of that of the first or second transistor. The sources of the third and fourth transistors are connected to a second voltage source having a second voltage that is lower than the first voltage. A fifth transistor is connected between the first transistor and the third transistor and has the same polarity as the third transistor. A sixth transistor is connected between the second transistor and the fourth transistor and has the same polarity as the fourth transistor. A voltage generation circuit is connected to the shift circuit to generate a gate control voltage, which is provided to the gates of the fifth transistor and the sixth transistor based on the first voltage.

The present invention further provides a semiconductor device including a level shift circuit. The level shift circuit includes a shift circuit for receiving an input signal and level-shifting the voltage of the input signal to generate a level-shifted signal. The shift circuit includes first and second transistors having the same polarity. The sources of the first and second transistors are connected to a first power supply having a first voltage. The gate of the first transistor is connected to the drain of the second transistor, and the gate of the second transistor is connected to the drain of the first transistor. The shift circuit further includes third and fourth transistors each having a polarity opposite that of the first or second transistor. The sources of the third and fourth transistors are connected to a second voltage source having a second voltage that is lower than the first voltage. A fifth transistor is connected between the first transistor and the third transistor and has the same polarity as the third transistor. A sixth transistor is connected between the second transistor and the fourth transistor and has the same polarity as the fourth transistor. A voltage generation circuit is connected to the shift circuit to generate a gate control voltage, which is provided to the gates of the fifth transistor and the sixth transistor based on the first voltage.

Other aspects and advantages of the present invention will become apparent from the following description, taken in conjunction with the accompanying drawings, illustrating by way of example the principle of the invention.

BRIEF DESCRIPTION OF THE DRAWINGS

The invention, together with objects and advantages thereof, may best be understood by reference to the descrip

DETAILED DESCRIPTION OF THE PREFERRED EMBODIMENTS

Figure 1:
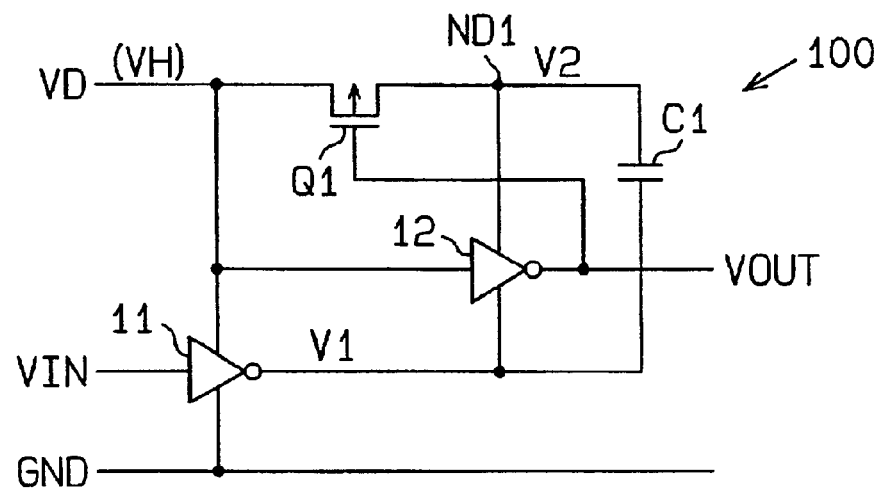
- FIG. 1 is a schematic circuit diagram of a first prior art level shift circuit.

In the drawings, like numerals are used for like elements throughout.

[First Embodiment]

Figure 5:
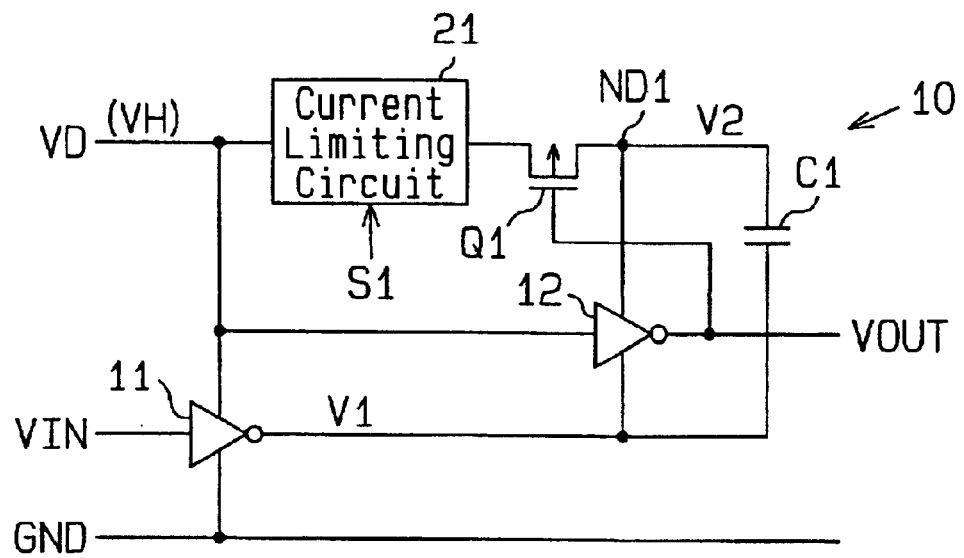
FIG. 5 is a schematic circuit diagram of a level shift circuit according to a first embodiment of the present invention.

FIG. 5 is a schematic circuit diagram of a level shift circuit 10 according to a first embodiment of the present invention. The level shift circuit 10 comprises a charge pump circuit.

The charge pump circuit 10 includes a second inverter 11, a first inverter 12, a pumping capacitor C1, a p-channel MOS transistor Q1, and a current limiting circuit 21. In contrast to the prior art charge pump circuit 100 illustrated in FIG. 1, a current limiting circuit 21 is added to the embodiment of the charge pump circuit 10. The charge pump circuit 10 provides an input signal VIN to the capacitor C1 and generates an output signal VOUT, whose voltage is higher than that of the input signal VIN.

The current limiting circuit 21 is connected between a high potential power supply VD and the PMOS transistor Q1 and thereby limits the flow of current from the capacitor C1 to the high potential power supply VD. The current limiting circuit 21 receives a control signal S1, and is activated and deactivated based on the control signal S1. The current limiting circuit 21 is deactivated earlier than the PMOS transistor Q1.

The second inverter 11 receives the input signal VIN. The output terminal of the second inverter 11 is connected to a low potential power supply terminal of the first inverter 12 and to the capacitor C1. The high potential power supply terminal of the first inverter 12 is connected to a first terminal (gate) of the PMOS transistor Q1, which functions as a charge control circuit. A second terminal (source or drain) of the PMOS transistor Q1 is connected to the high potential power supply VD via the current limiting circuit 21.

The capacitor C1 is connected between the high potential and low potential power supply terminals of the first inverter 12. The input terminal of the first inverter 12 is connected to the high potential power supply VD. The output terminal of the first inverter 12 outputs the output signal VOUT. The output signal VOUT is provided to the gate of the PMOS transistor Q1.

First, when the input signal VIN is high (at a level corresponding to the high potential voltage VH), the voltage of the signal output from the second inverter 11 (first inverter voltage V1) is at the GND level (0V). In this state, the output signal VOUT of the first inverter 12 is also at the GND level. The gate of the PMOS transistor Q1 receives the output signal VOUT at the GND level. This activates the PMOS transistor Q1.

In this state, a control signal S1 causes the current limiting circuit 21 to become conductive, and the capacitor C1 is charged via the PMOS transistor Q1 by way of the high potential power supply VD. Thus, the node voltage V2 is increased to the level of high potential voltage VH.

Subsequently, when the input signal VIN is shifted to the low level (GND level), the first inverter voltage V1 is shifted to the high potential voltage VH. Then, the charge stored in the capacitor C1 increases the node voltage V2 to a level two times the high potential voltage VH (i.e., 2VH).

When the node voltage V2 is increased, the control signal S1 causes the current limiting circuit 21 to become non-conductive. Thus, although the PMOS transistor Q1 is active when the node voltage V2 starts to increase, the current limiting circuit 21 stops the flow of current. Thus, the charge stored in the capacitor C1 does not flow in the reverse direction toward the high potential power supply VD.

In this state, the node voltage V2 increases in correspondence with the increase in the first inverter voltage V1. That is, the rising time of the node voltage V2 is shortened in comparison with the prior art charge pump circuit 100. This shortens the voltage step up time at the high potential power supply terminal of the first inverter 12 and increases the speed for shifting the output signal VOUT from the low level (0V) to the high level (2VH).

Figure 6:
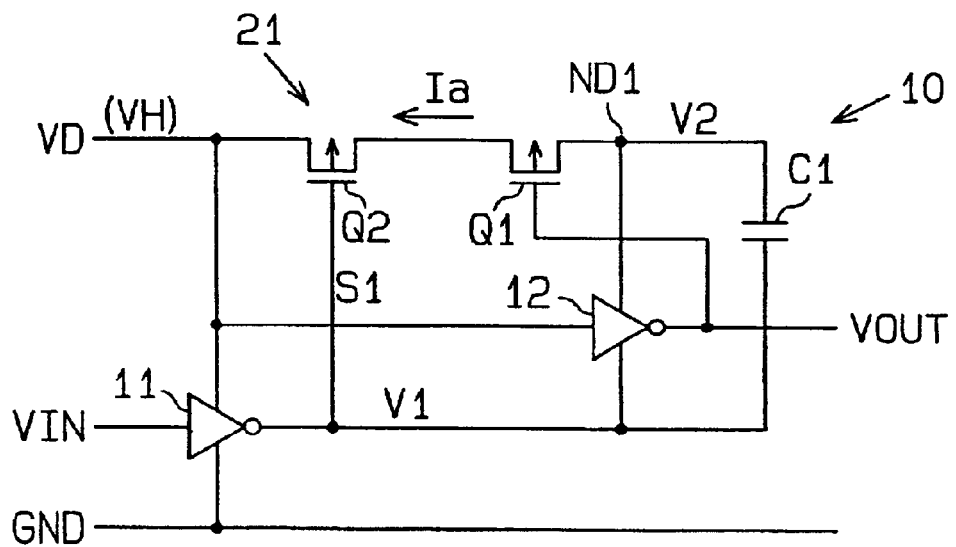
FIG. 6 is a circuit diagram of the level shift circuit of FIG. 5.

With reference to FIG. 6, the current limiting circuit 21 of the first embodiment includes a second PMOS transistor Q2, the gate of which is connected to the output terminal of the second inverter 11. The control signal S1 is the output signal of the second inverter 11. That is, the first inverter voltage V1 is provided to the gate of the second PMOS transistor Q2. Accordingly, the second PMOS transistor Q2 is activated and deactivated based on the first inverter voltage V1.

Figure 7:
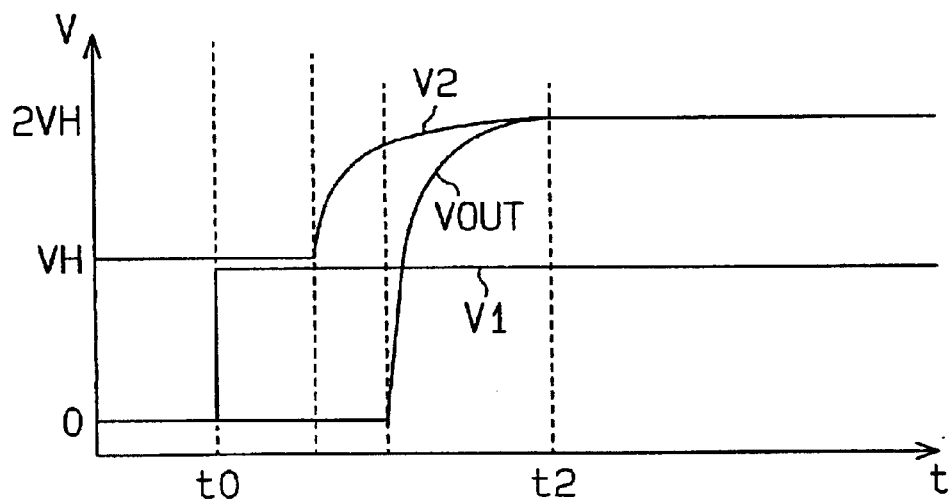
FIG. 7 is a combined timing and waveform chart illustrating the operation of the level shift circuit of FIG. 6.

Referring to FIG. 7, the first inverter voltage V1 starts to shift before the output voltage VOUT. Accordingly, the second PMOS transistor Q2 is deactivated earlier than the first PMOS transistor Q1.

In the first embodiment, the employment of the current limiting circuit 21 (i.e., the second PMOS transistor Q2) in FIG. 6 decreases the charge that leaks from the capacitor C1 to the high potential power supply VD when the input signal VIN goes low. This increases the voltage step-up speed of the output signal VOUT.

Figure 2:
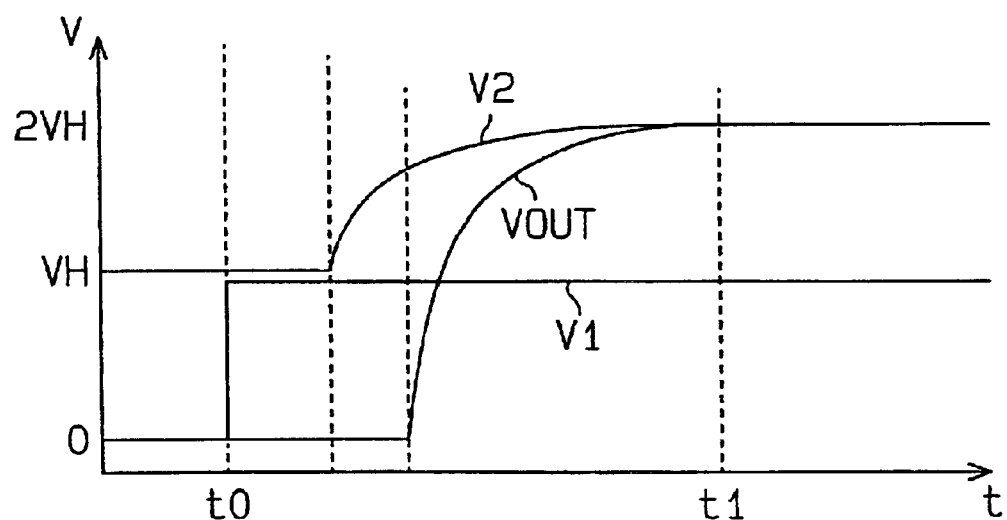
FIG. 2 is a combined timing and waveform chart illustrating the operation of the level shift circuit of FIG. 1.
Figure 3:
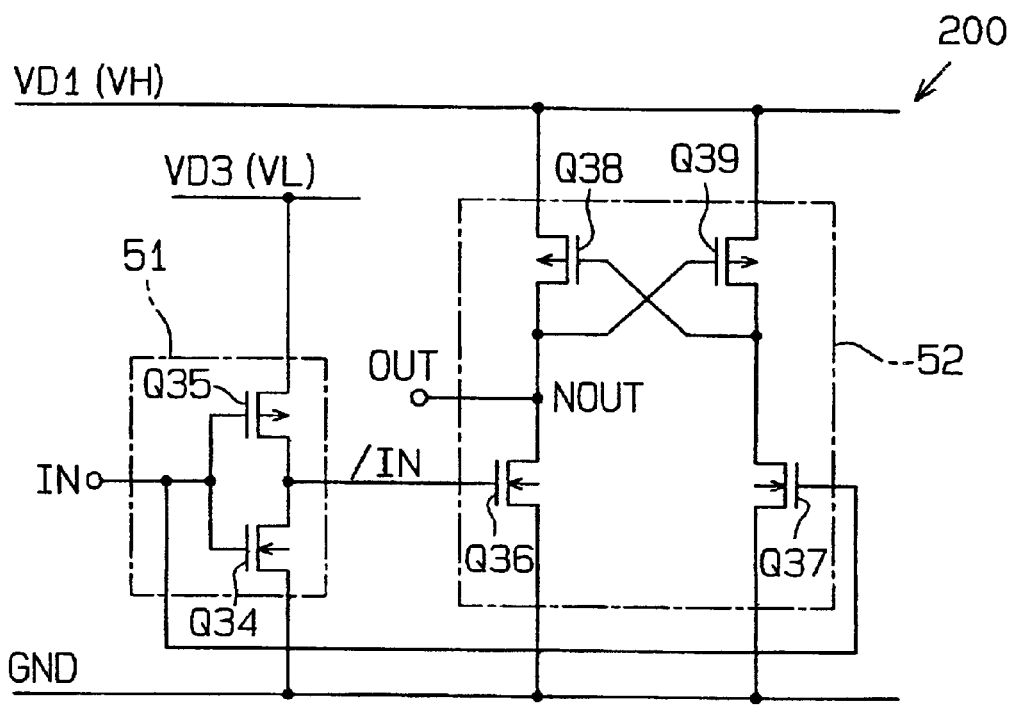
FIG. 3 is a circuit diagram of a second prior art level shift circuit.
Figure 4:
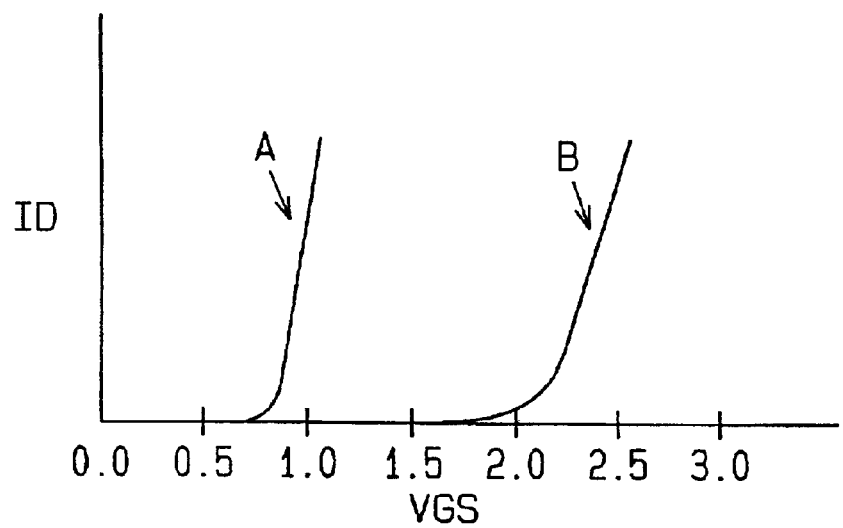
FIG. 4 is a graph showing the relationship between the gate-source voltage and the drain current in transistors.

Accordingly, the time length between time t0 and time t1 in FIG. 2 is shortened to the time length between time t0 and time t2 in FIG. 7. Time t0 is the time at which the first inverter voltage V1 shifts from the low level to the high level. Time t2 is the time at which the output voltage VOUT increases substantially to the node voltage VOUT. Thus, the response of the charge pump circuit 10 is faster than that of the prior art charge pump circuit 100.

Figure 8:
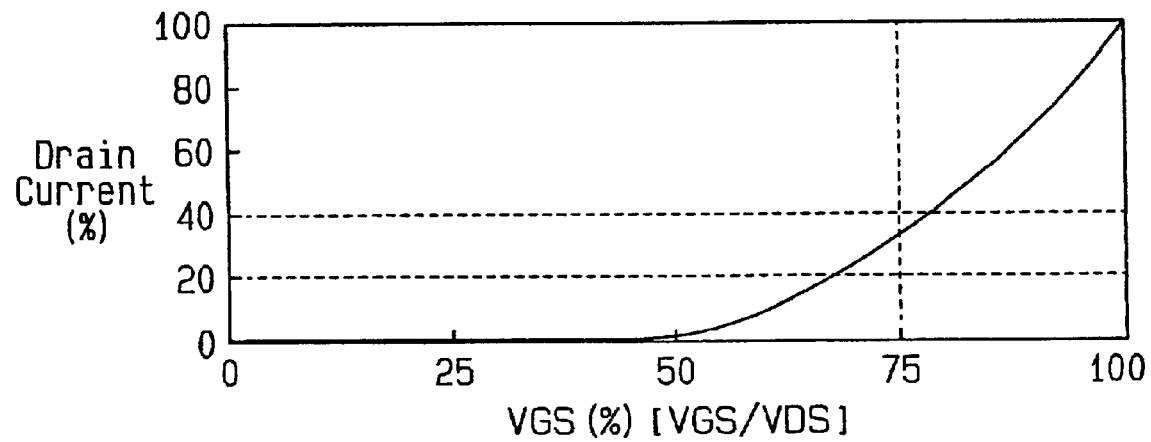
FIG. 8 is a graph illustrating the characteristic of a MOS transistor.

The first inverter voltage V1 provided to the gate of the transistor Q2 must be two times the high potential voltage VH in order to fully deactivate the second PMOS transistor Q2. However, the first inverter voltage V1 is increased to only the voltage VH. As shown in FIG. 8, the characteristic of the gate-source voltage (VGS) relative to the source-drain voltage (VDS) of a MOS transistor is expressed by a quadratic curve.

The vertical axis in FIG. 8 represents the percentage (%) of the drain current (ID) in the NMOS transistor. The drain current percentage is 100% when the gate-source voltage (VGS) is equal to the source-drain voltage (VDS). The horizontal axis represents the percentage (%) of the source-gate voltage (VGS) relative to the source-drain voltage (VDS).

As apparent from FIG. 8, the MOS transistor impedes 90% or more of the drain current when the gate-source voltage (VGS) is at 50%. Accordingly, in comparison to the prior art circuit, the second PMOS transistor Q2 decreases the charge that leaks from the capacitor C1 to the high potential power supply VD and increases the voltage step-up speed of the output voltage VOUT.

The charge pump circuit 10 has the advantages described below.

(1) The current limiting circuit 21 is connected between the high potential power supply VD and the first PMOS transistor Q1. When the capacitor C1 performs voltage step-up, the current limiting circuit 21 limits the charge that leaks from the capacitor C1 to the high potential power supply VD and increases the voltage step-up efficiency. This improves the response of the output signal VOUT in the charge pump circuit 10.

(2) The current limiting circuit 21 includes the second PMOS transistor Q2 and provides the first inverter voltage V1 to the gate of the transistor Q2. Since the first inverter voltage V1 starts to shift before the output signal VOUT does, the second PMOS transistor Q2 is deactivated before the first PMOS transistor Q1. This decreases the charge that leaks from the capacitor C1 to the high potential power supply VD.

(3) The low potential power supply terminal of the first inverter 12 receives the first inverter voltage V1. The high potential power supply terminal of the first inverter 12 receives the node voltage V2, whose voltage is increased from the first inverter voltage V1 by an amount equal to the voltage VH. Accordingly, the potential difference between the high potential and low potential power supply terminals of the first inverter 12 is equal to the potential difference (VH) between the high potential power supply VD and the ground GND. Further, a voltage equal to or greater than the potential difference (VH) is not provided between the terminals of the PMOS transistors Q1, Q2. Thus, the charge pump circuit 10 needs only a device operated in correspondence with the potential difference between the high potential power supply VD and the ground GND. This avoids the necessity for using devices having larger dimensions and thereby increasing the area of the charge pump circuit 10.

[Second Embodiment]

Figure 9:
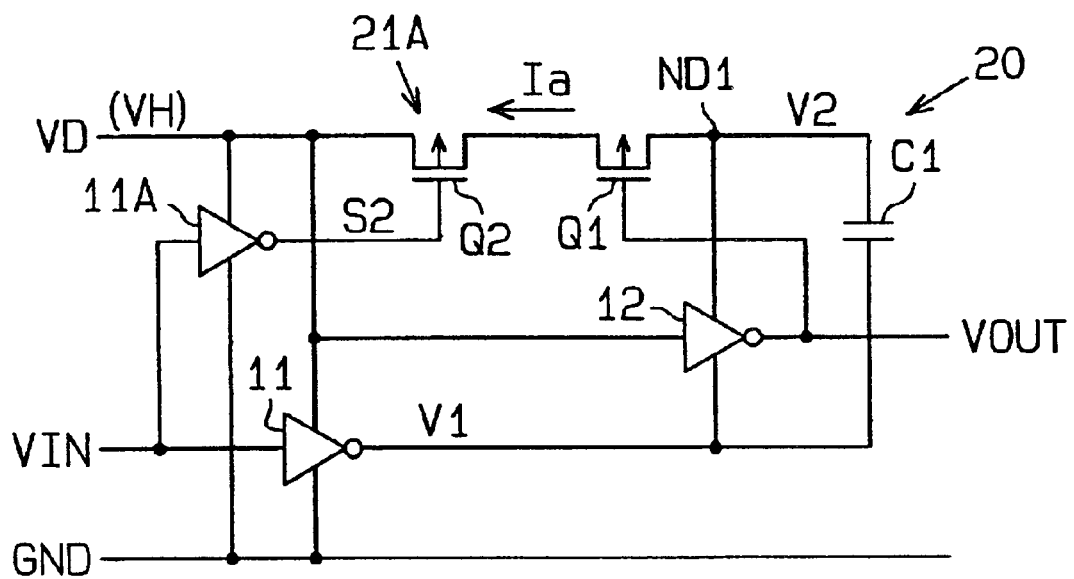
FIG. 9 is a schematic circuit diagram of a level shift circuit according to a second embodiment of the present invention.

FIG. 9 is a schematic circuit diagram of a level shift circuit 20 according to a second embodiment of the present invention. The level shift circuit 20 comprises a charge pump circuit.

The charge pump circuit 20 includes a first inverter 12, a second inverter 11, a capacitor C1, a PMOS transistor Q1, and a current limiting circuit 21A.

The current limiting circuit 21A includes a third inverter 11A and a second PMOS transistor Q2. The second PMOS transistor Q2 is connected between the first PMOS transistor Q1 and a high potential power supply VD.

The input terminal of the third inverter 11A is connected to the input terminal of the second inverter 11. The output terminal of the third inverter 11A is connected to the gate of the second PMOS transistor Q2. The third inverter 11A receives the input signal VIN and generates an inverted input signal /VIN. A control signal S2 is provided to the gate of the second PMOS transistor Q2. The second PMOS transistor Q2 is activated and deactivated based on the control signal S2.

The load of the second inverter 11 is the first inverter 12 and the capacitor C1. The load of the third inverter 11A is only the second PMOS transistor Q2. Accordingly, the load of the third inverter 11A is less than that of the second inverter 11.

The operating speed of the third inverter 11A is thus higher than that of the second inverter 11. Accordingly, the shifting speed of the control signal S2 is higher than that of the output signal of the second inverter 11. As a result, the voltage step-up speed of the output signal VOUT in the charge pump circuit 20 of the second embodiment is higher than that of the charge pump circuit 10 of the first embodiment.

The charge pump circuit 20 of the second embodiment has the advantage described below.

(1) The load of the third inverter 11A is smaller than that of the second inverter 11. Thus, the shifting speed of the output signal of the third inverter 11A is higher than the shifting speed of the output signal of the second inverter 11. Thus, the second PMOS transistor Q2 is deactivated earlier than the first PMOS transistor Q1, so to restrict the charge leak from the capacitor C1. This further increases the voltage step-up speed of the output signal VOUT. In other words, this further improves the response of the charge pump circuit.

[Third Embodiment]

Figure 10:
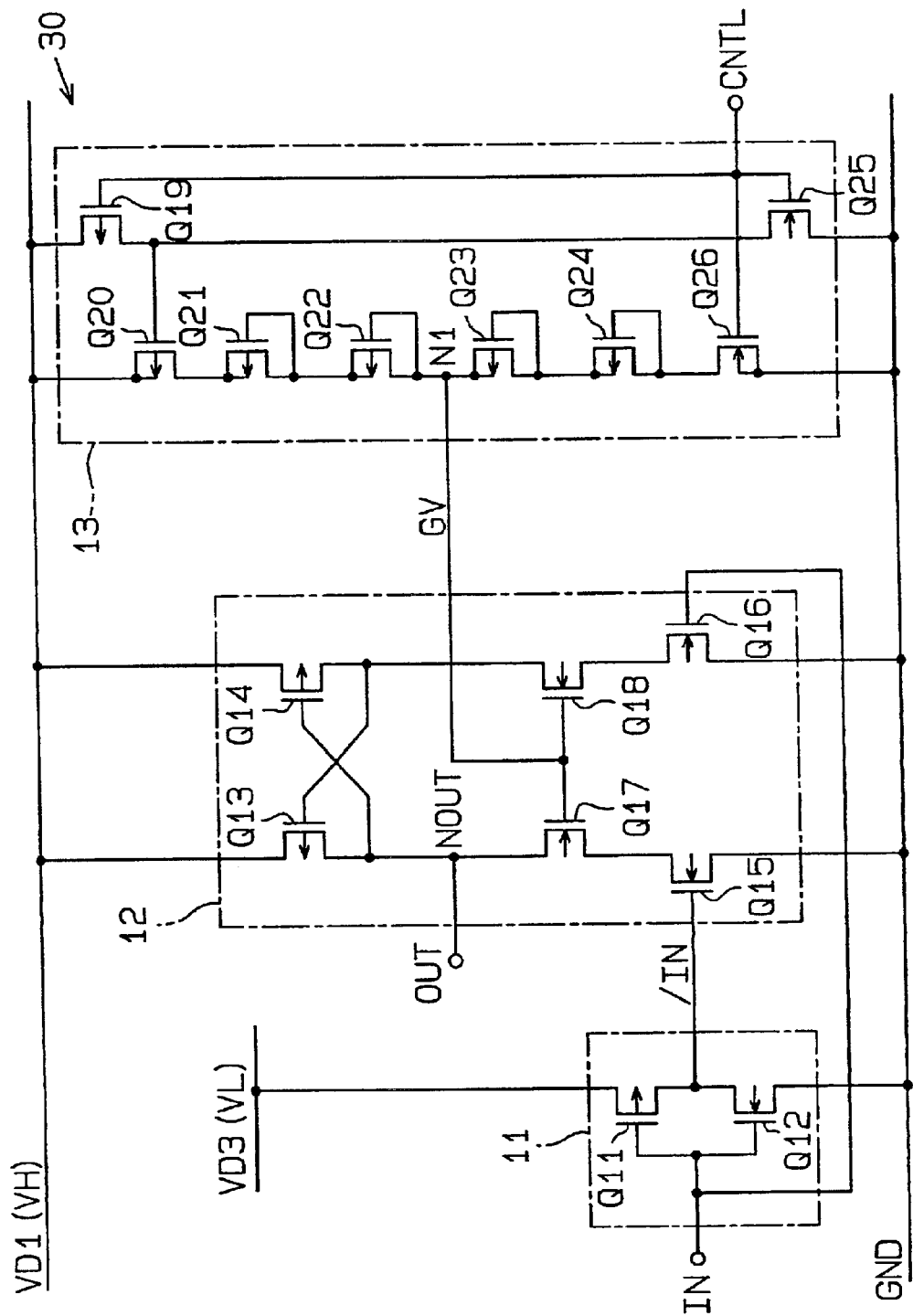
FIG. 10 is a schematic circuit diagram of a level shift circuit according to a third embodiment of the present invention.

FIG. 10 is a schematic circuit diagram of a level shift circuit 30 according to a third embodiment of the present invention. The level shift circuit 30 includes an input circuit 11, a shift circuit 12, and a voltage generation circuit 13.

The input circuit 11 is connected between a second power supply (ground) GND and a third power supply VD3. The shift circuit 12 and the voltage generation circuit 13 are connected between the ground GND and a first power supply VD1. In the third embodiment, the voltage of the first power supply VD1, or first voltage VH, is 3.0V. The voltage of the third power supply VD3, or third voltage VL, is 1.0V. The level shift circuit 30 receives an input signal IN having the third voltage VL and increases the third voltage VL to the level of the first voltage VH. The level shift circuit 30 generates the output signal OUT at the level of the first voltage VH.

The input circuit 11 has a CMOS inverter circuit including a PMOS transistor Q11 and an NMOS transistor Q12. The source of the PMOS transistor Q11 is connected to the third power supply VD3, and the source of the NMOS transistor Q12 is connected to the ground GND. The CMOS inverter circuit receives the input signal IN, inverts the input signal IN to generate an inverted input signal /IN, and provides the inverted input signal /IN to the shift circuit 12.

The shift circuit 12 includes a first transistor Q13, a second transistor Q14, a third transistor Q15, a fourth transistor Q16, a fifth transistor Q17, and a sixth transistor Q18. The first and second transistors Q13, Q14 are PMOS transistors, and the third to sixth transistors Q15–Q18 are NMOS transistors.

The sources of the first and second transistors Q13, Q14 are connected to the first power supply VD1. The gates of the first and second transistors Q13, Q14 are connected to the drains of the second and first transistors Q14, Q13, respectively.

The sources of the third and fourth transistors Q15, Q16 are connected to the ground GND. The gate of the third transistor Q15 receives the inverted signal /IN, and the gate of the fourth transistor Q16 receives the input signal IN. The drains of the third and fourth transistors Q15, Q16 are connected to the sources of the fifth and sixth transistors Q17, Q18, respectively.

The drains of the fifth and sixth transistors Q17, Q18 are connected to the drains of the first and second transistors Q13, Q14, respectively. The gates of the fifth and sixth transistors Q17, Q18 are connected to each other, and a node between the gates of the fifth and sixth transistors Q17, Q18 is connected to a voltage generation circuit 13. An output signal OUT is generated from a node NOUT between the first transistor Q13 and the fifth transistor Q17.

The threshold voltage for activating and deactivating the third and fourth transistors Q15, Q16 in response to the respective input signals /IN, IN is low. Thus, the transistors Q15, Q16 each have a low withstand voltage. Accordingly, the third and fourth transistors Q15, Q16 are low withstand voltage devices.

The first, second, fifth, and sixth transistors Q13, Q14, Q17, and Q18 are high withstand voltage devices and are applicable to the first voltage VH.

The voltage generation circuit 13 is connected between the first power supply VD1 and the ground GND, so to generate a gate control voltage GV based on the first voltage VH and provide the gate control voltage GV to the gates of the fifth and sixth transistors Q17, Q18. The value of the gate control voltage GV is set so that the third and fourth transistors Q15, Q16, which are low withstand voltage devices, are not damaged when the fifth and sixth transistors Q17, Q18 are activated.

In the third embodiment, the source-drain withstand voltage of the low withstand voltage devices (the third and fourth transistors Q15, Q16) is 1.5V. The source-drain withstand voltage of the high withstand voltage devices (the first, second, fifth, and sixth transistors Q13, Q14, Q17, Q18) is 3.0V. The gate-source voltage of the high withstand voltage devices Q17, Q18 is 0.5V.

Accordingly, the voltage generation circuit 13 of the third embodiment generates the gate control voltage GV at, for example, 1.5V (which is one half of the first voltage VH) and provides the gate control voltage of 1.5V to the gates of the fifth and sixth NMOS transistors Q17, Q18.

More specifically, the voltage generation circuit 13 includes a seventh transistors Q19, an eighth transistor Q20, a ninth transistor Q21, a tenth transistor Q22, an eleventh transistor Q23, a twelfth transistor Q24, a thirteenth transistor Q25, and a fourteenth transistor Q26. The seventh to twelfth transistors Q19–Q24 are PMOS transistors, and the thirteenth and fourteenth transistors Q25, Q26 are NMOS transistors.

The seventh transistor Q19 and the thirteenth transistor Q25 constitute a CMOS inverter circuit. Input terminals of the CMOS inverter circuit, or the gates of the transistors Q19, Q25 receive a control signal CNTL. The source of the seventh transistor Q19 is connected to the first power supply VD1, and the source of the thirteenth transistor Q25 is connected to the ground GND. Output terminals of the CMOS inverter circuit, or the drains of the seventh transistor Q19 and the thirteenth transistors Q25, are connected to the gate of the eighth transistor Q20.

The source of the eighth transistor Q20 is connected to the first power supply VD1. The drains of the eighth to eleventh transistors Q20, Q21, Q22, Q23 are respectively connected to the sources of the ninth to twelfth transistors Q21, Q22, Q23, Q24. The drain of the twelfth transistor Q24 is connected to the drain of the fourteenth transistor Q26, and the source of the fourteenth transistor Q26 is connected to the ground GND. The gate of the fourteenth transistor Q26 receives the control signal CNTL. The drain and gate are connected to each other in each of the ninth to twelfth transistors Q21, Q22, Q23, Q24.

A node N1 between the drain of the tenth transistor Q22 and the source of the fifth transistor Q23 is connected to the gates of the fifth and sixth transistors Q17, Q18 in the shift circuit 12. That is, the voltage generation circuit 13 generates the gate control voltage GV at node N1.

The operation of the level shift circuit 30 will now be discussed. When the control signal CNTL received by the voltage generation circuit 13 goes high, the seventh transistor Q19 is deactivated and the thirteenth transistor Q25 is activated. In this state, the gate of the eighth transistor Q20 is connected to the ground GND and the transistor Q20 is activated.

Based on the high control signal CNTL, the fourteenth transistor Q26 is activated. In this state, the drain voltage of the eighth transistor Q20 is substantially the same as the first voltage VH (3.0V), and the drain voltage of the fourteenth transistor Q26 is substantially the same as the ground GND voltage. The first voltage VH is divided by the ninth to twelfth transistors Q21, Q22, Q23, Q24. The gate control voltage GV at node N1 is 1.5V, about one half of the first voltage VH.

In this state, when the level shift circuit 30 receives the input signal IN at the third voltage VL (1.0V), the third transistor Q15 of the shift circuit 12 is deactivated and the fourth transistor Q16 is activated. Accordingly, the drain voltage of the second transistor Q14, or the gate voltage of the first transistor Q13, is at the ground GND level and the first transistor Q13 is activated.

Then, the drain of the first transistor Q13 provides the gate of the second transistor Q14 with the first voltage VH (3.0V) and thereby deactivates the second transistor Q14. Further, the drain of the fifth transistor Q17 receives the first voltage VH and the output signal OUT is output at the first voltage VH (3.0V) from the node NOUT.

In this state, the gate of the fifth transistor Q17 is provided with the gate control voltage GV of about 1.5V. Thus, the source voltage of the fifth transistor Q17, or the drain voltage of the third transistor Q15 (low withstand voltage device), is about 1.0V. Accordingly, the source-drain voltage of the third transistor Q15 is 1.0V. Thus, the third transistor Q15, whose source-drain voltage is 1.0V and withstand voltage is 1.5V, functions in an optimal manner.

When the level shift circuit 30 receives the input signal IN at the ground GND level (0V), the level shift circuit 30 outputs the output signal OUT at 0V. In this state, the source-drain voltage of the fourth transistor Q16 is about 1.0V. Thus, the fourth transistor Q16 functions in an optimal manner.

The level shift circuit 30 of the third embodiment has the advantage described as follows.

(1) The voltage generation circuit 13 generates the gate control voltage GV based on the first voltage VH, which is higher than the third voltage VL, and provides the gate control voltage GV to the gates of the fifth and sixth transistors Q17, Q18. The value of the gate control voltage GV is set such that the transistors Q15, Q16 (low withstand voltage devices), which are driven by the third voltage VL, function optimally when the fifth and sixth transistors Q17, Q18 are activated. Thus, in the level shift circuit 30, which includes the low withstand and high withstand voltage devices, the reliability of the low withstand voltage devices is enhanced.

[Fourth Embodiment]

Figure 11:
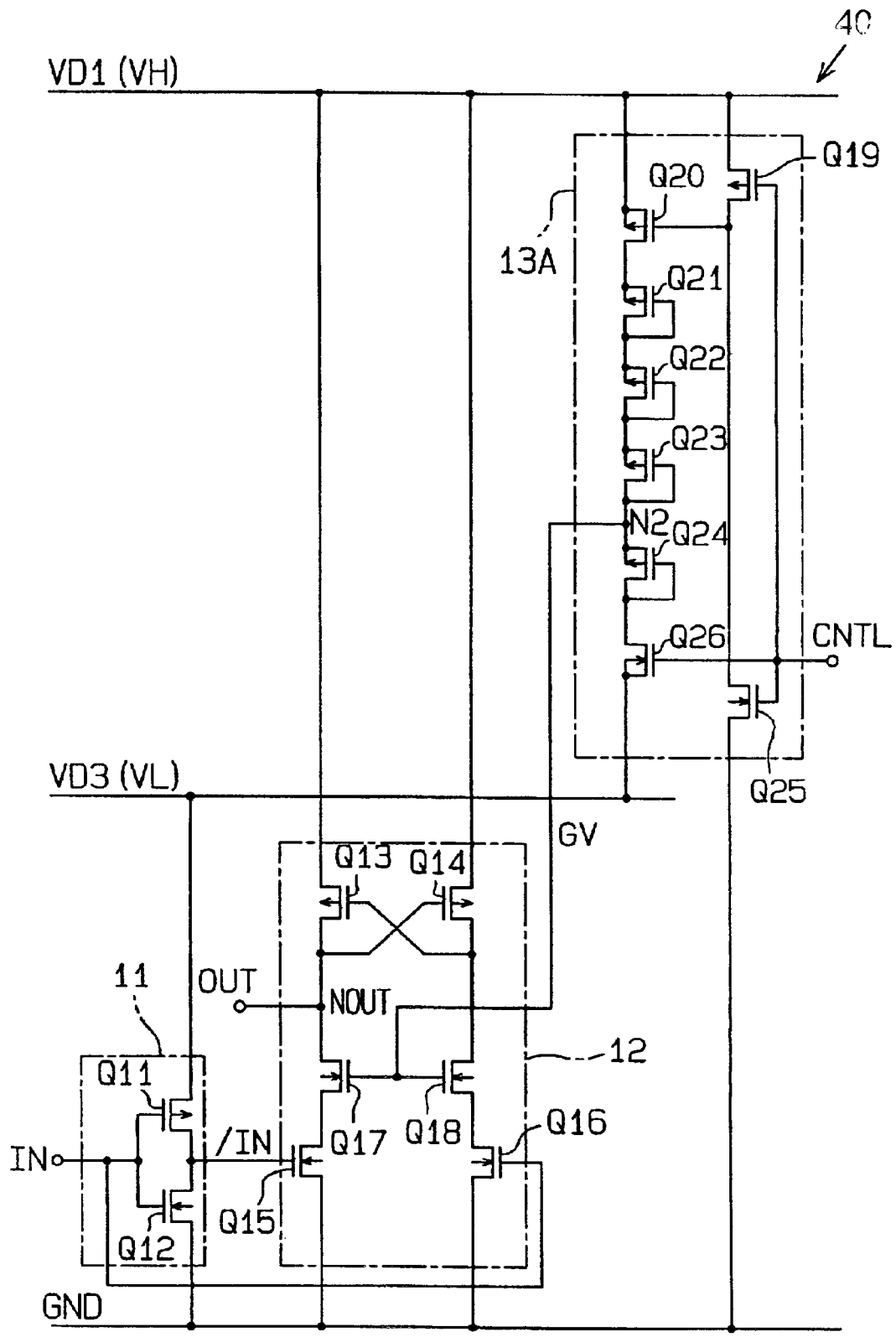
FIG. 11 is a schematic circuit diagram of a level shift circuit according to a fourth embodiment of the present invention.

FIG. 11 is a circuit diagram of the level shift circuit 40 according to a fourth embodiment of the present invention. The level shift circuit 40 includes an input circuit 11, a shift circuit 12, and a voltage generation circuit 13A. The level shift circuit 40 has a voltage generation circuit 13A that is different from the voltage generation circuit 13 in the level shift circuit 30 of the third embodiment.

The voltage generation circuit 13 in the level shift circuit 30 shown in FIG. 10 is connected to a first power supply VD1 and the ground GND. In contrast, the voltage generation circuit 13A in the level shift circuit 40 is connected to the first power supply VD1, the ground GND, and a third power supply VD3. That is, as shown in FIG. 11, the source of the fourteenth transistor Q26 in the voltage generation circuit 13A is connected to the third power supply VD3.

Further, the gate control voltage GV is generated at node N2 between the eleventh transistor Q23 and the twelfth transistor Q24 in the voltage generation circuit 13A.

The voltage generation circuit 13A divides the differential voltage between the first voltage VH and the third voltage VL and adds the third voltage VL to the divided voltage to generate the gate control voltage GV. The gate control voltage GV is provided to the gates of the fifth and sixth transistors Q17, Q18.

More specifically, the difference between the first voltage VH and the third voltage VL is 2.0V. About one fourth of the differential voltage (2.0V), or 0.5V, is added to the third voltage VL of 1.0V. The thus-obtained voltage of 1.5V is the gate control voltage GV of the fourth embodiment. Accordingly, the gate control voltage GV of the voltage generation circuit 13A is equal to the voltage generation circuit 13 of the third embodiment.

The operation of the level shift circuit 40 will now be discussed. The voltage generation circuit 13A provides the gates of the fifth and sixth transistors Q17, Q18 with the gate control voltage GV of about 1.5V. Accordingly, the drain voltages of the third and fourth transistors Q15, Q16 are each 1.0V or less, regardless of the activation or deactivation of the transistors Q15, Q16. Since the drain voltages of the third and fourth transistors Q15, Q16 are less than the source-drain voltages (each about 1.5V) of the third and fourth transistors Q15, Q16, the transistors Q15, Q16 function in an optimal manner.

A state in which the third voltage VL (1.0V) is steadily provided to the level shift circuit 40 and the fluctuation of the first voltage VH is in a range of ±0.5V will now be discussed.

If, for example, the first voltage VH increases to 3.5V, the gate control voltage GV at node N2 is about 1.63V. In this state, the drain voltage of the third and fourth transistors Q15, Q16 is about 1.13V. In comparison, the gate control voltage GV at the node N1 in the third embodiment is about 1.75V, and the drain voltages of the third and fourth transistors Q15, Q16 are each about 1.25V.

When the first voltage VH decreases to 2.5V, the gate control voltage GV at node N2 is about 1.38V. In this state, the drain voltages of the third and fourth transistors Q15, Q16 are each about 0.88V. In comparison, the gate control voltage GV at the node N1 is about 1.25V, and the drain voltages of the third and fourth transistors Q15, Q16 are each about 0.75V.

Accordingly, with regard to the fluctuations of the drain voltages of the third and fourth transistors Q15, Q16 relative to the fluctuation of the first voltage VH, the fluctuation in the level shift circuit 40 of the fourth embodiment is smaller than that in the level shift circuit 30 of the third embodiment.

The level shift circuit 40 of the fourth embodiment has the advantage described as follows.

(1) The voltage generation circuit 13A divides the differential voltage between the voltage at the first power supply VD1 and the voltage at the third power supply VD3 and adds the voltage of the third power supply VD3 (third voltage VL) to generate the gate control voltage GV. The gate control voltage GV is provided to the gates of the fifth and sixth transistors Q17, Q18. Thus, the fluctuations of the drain voltages of the third and fourth transistors Q15, Q16 relative to the voltage fluctuation of the first power supply VD1 decreases, in comparison with the level shift circuit 30 of the third embodiment. Accordingly, the reliability of the third and fourth transistors Q15, Q16 is improved relative to the voltage fluctuation in the first power supply VD1.

[Fifth Embodiment]

Figure 12:
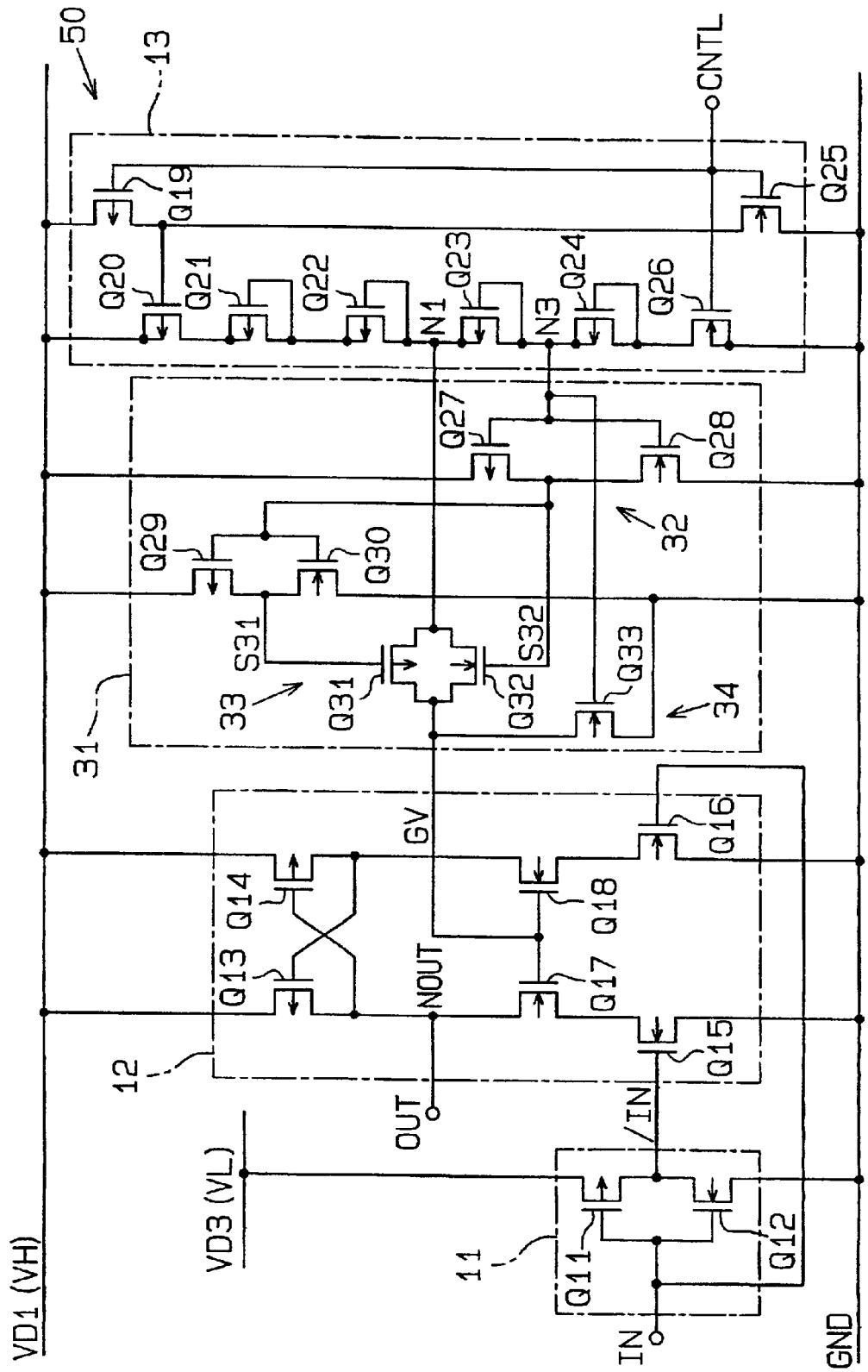
FIG. 12 is a schematic circuit diagram of a level shift circuit according to a fifth embodiment of the present invention.

FIG. 12 is a circuit diagram of a level shift circuit 50 according to a fifth embodiment of the present invention. The level shift circuit 50 includes an input circuit 11, a shift circuit 12, a voltage generation circuit 13, and a protection circuit 31. The level shift circuit 50 is configured by adding the protection circuit 31 to the configuration of the level shift circuit 30 of the third embodiment.

When the gate control voltage GV of the voltage generation circuit 13 is unstable and exceeds a predetermined voltage, the protection circuit 31 disconnects the node N1 from the gates of the fifth and sixth transistors Q17, Q18. Thus, the third and fourth transistors (low withstand voltage devices) Q15, Q16 are protected even if the gate control voltage GV exceeds the predetermined voltage.

When the level shift circuit 50 is activated, or when the control signal CNTL provided to the level shift circuit 50 is shifted, the gate control voltage GV may be unstable and fluctuate. For example, after the control signal CNTL shifts from a low level to a high level and until the charging of the internal capacitances of the eighth to twelfth transistors Q20–Q24 and the fourteenth transistor Q26 is completed, the gate control voltage GV may increase to a value close to the first voltage VH (3.0V). Thus, the drains of the third and fourth transistors (low withstand voltage devices) Q15, Q16 may be provided with a voltage exceeding the withstand voltage. Accordingly, when the gate control voltage GV exceeds the predetermined value, the protection circuit 31 impedes the gate control voltage GV and prevents the voltage exceeding the withstand voltage value from being provided to the drains of the third and fourth transistors Q15, Q16.

The protection circuit 31 will now be described in detail. The protection circuit 31 includes a switch signal generation circuit 32, a first switch circuit 33, and a second switch circuit 34.

The switch signal generation circuit 32 generates a switch signal for controlling the opening and closing of the first and second switch circuits 33, 34 based on the voltage (first control voltage) provided from the node N3 of the voltage generation circuit 13.

The first switch circuit 33 is connected between the node N1 and the gates of the fifth and sixth transistors Q17, Q18.

The second switch circuit 34 is connected between the gates of the fifth and sixth transistors Q17, Q18 and the ground GND.

The first switch circuit 33 is activated and deactivated based on the switch signal. The second switch circuit 34 is activated and deactivated based on the voltage at the node N3 between the eleventh and twelfth transistors Q23, Q24 of the voltage generation circuit 13.

The deactivated first switch circuit 33 prevents an unstable gate control voltage GV from being provided to the gates of the fifth and sixth transistors Q17, Q18. The activated second switch circuit 34 connects the gates of the fifth and sixth transistors Q17, Q18 to the ground GND.

The switch signal generation circuit 32 includes first and second CMOS inverter circuits. The first CMOS inverter circuit has a PMOS transistor Q27 and an NMOS transistor Q28. The second CMOS inverter circuit includes a PMOS transistor Q29 and an NMOS transistor Q30.

Based on the voltage at the node N3, the switch signal generation circuit 32 generates first and second switch signals S31, S32. The second CMOS inverter circuit inverts the second switch signal S32 and generates the first control signal S31.

The first switch circuit 33 includes a PMOS transistor Q31 and an NMOS transistor Q32, which are connected in parallel. The gate of the PMOS transistor Q31 receives the first switch signal S31, and the gate of the NMOS transistor Q32 receives the second switch signal S32. Accordingly, the transistors Q31, Q32 are simultaneously activated and deactivated.

The second switch circuit 34 includes the NMOS transistor Q33. The gate of the transistor Q33 is connected to the node N3. The first switch circuit 33 and the second switch circuit 34 are activated and deactivated in a complementary manner.

The operation of the level shift circuit 50 will now be described. When the control signal CNTL received by the voltage generation circuit 13 goes high, the fourteenth transistor Q26 is activated. Further, the inverter circuit including the seventh transistor Q19 and the thirteenth transistor Q25 provides the eighth transistor Q20 with a low signal. In this state, the eighth transistor Q20 is activated, and the first voltage VH is provided to the eighth transistor Q20. This starts charging the internal capacitances of the eighth transistors Q20–Q24 and the fourteenth transistor Q26.

Until the charging of the internal capacitances of the transistors Q20–Q24, Q26 is completed, the node voltage VN1 at the node N1 is substantially equal to the node voltage VN3 at the node N3 and close to the first voltage VH (3.0V). In this state, the node voltage VN3 activates the second switch circuit 34. Since the first switch signal S31 is high (3.0V) and the second control signal S31 is low (0V), the first switch circuit 33 is deactivated.

The NMOS transistor Q33 of the second switch circuit 34 receives the node voltage VN3 at the high level (3.0V). This activates the second switch circuit 34. Accordingly, the gates of the fifth and sixth transistors Q17, Q18 are connected to the ground GND via the NMOS transistor Q33.

Subsequently, when the charging of the internal capacitance of the transistors Q20–Q24, Q26 is completed, the node voltage VN1 decreases to about one half the first voltage VH, or 1.5V. In this state, the node voltage VN3 deactivates the second switch circuit 34 and activates the first switch circuit 33. Thus, the gate control voltage GV that is substantially 1.5V is provided to the gates of the fifth and sixth transistors Q17, Q18.

The level shift circuit 50 of the fifth embodiment has the advantage described as follows.

(1) When the node voltage VN1 increases to a value close to the first voltage VH, the protection circuit 31 activates the second switch circuit 34 based on the node voltage VN3 and deactivates the first switch circuit 33. In this state, the gates of the fifth and sixth transistors Q17, Q18 are connected to the ground GND via the second switch circuit 34. Accordingly, the third and fourth transistors Q15, Q16 are prevented from being provided with a voltage that exceeds the withstand voltage, even if the node voltage VN1 increases.

It should be apparent to those skilled in the art that the present invention may be embodied in many other alternative forms without departing from the principle and the scope of the invention. Particularly, it should be understood that the present invention may be embodied in the following forms.

In the first embodiment, the second inverter 11 may be deleted.

In the first and second embodiments, the configuration of the charge control circuit and the current limiting circuit may be altered as desired. For example, diodes may be used in lieu of the PMOS transistors Q1, Q2.

In the third to fifth embodiments, the ninth to twelfth transistors Q21–Q24 of the voltage generation circuits 13, 13A may be NMOS transistors or resistors.

In the third embodiment, the node at which the gate control voltage GV is generated in the voltage generation circuit 13 may be altered as required, based on the value of the first voltage VH.

In the fifth embodiment, the configuration of the protection circuit 31 may be altered as desired, so long as the third and fourth transistors Q15, Q16 are protected when the gate control voltage GV increases.

In the fifth embodiment, the node between the protection circuit 31 and the voltage generation circuit 13 may be altered as desired.

The protection circuit 31 of the fifth embodiment may be implemented in the level shift circuit 40 of the fourth embodiment.

The present examples and embodiments are to be considered as illustrative and not restrictive, and the invention is not to be limited to the details given herein, but may be modified within the scope and equivalence of the appended claims.

What is claimed is:

1. A level shift circuit for converting a voltage level of an input signal to a predetermined voltage level and generating a level-shifted signal, the level shift circuit comprising:

a capacitor having a first electrode connected to a high potential power supply and a second electrode for receiving the input signal;

a charge control circuit connected to the first electrode of the capacitor for providing the voltage of the high potential power supply to the capacitor and controlling charging of the capacitor;

a first inverter for receiving the voltage of the high potential power supply and generating the level-shifted signal, wherein the first inverter includes a high potential power supply terminal connected to the first electrode of the capacitor and a low potential power supply terminal connected to the second electrode of the capacitor; and a current limiting circuit connected to the charge control circuit for limiting the discharge current of the capacitor.

2. The level shift circuit according to claim 1, wherein the current limiting circuit is controlled at a time different from that of the charge control circuit.

3. The level shift circuit according to claim 2, wherein the charge control circuit includes a first PMOS transistor, the gate of which receives the level-shifted signal of the first inverter.

4. The level shift circuit according to claim 3, wherein the current limiting circuit includes a second PMOS transistor, the gate of which receives the input signal.

5. The level shift circuit according to claim 4, wherein the input signal has the voltage of the high potential power supply.

6. The level shift circuit according to claim 3, further comprising:

a second inverter for generating an inverted input signal by inverting the input signal and providing the inverted input signal to the second electrode of the capacitor, wherein the second inverter includes a high potential power supply terminal for receiving the voltage of the high potential power supply and a low potential power supply terminal for receiving a voltage lower than the voltage of the high potential power supply, and wherein the current limiting circuit includes a second PMOS transistor, the gate of which receives the inverted input signal.

7. The level shift circuit according to claim 6, wherein the input signal has the voltage of the high potential power supply.

8. The level shift circuit according to claim 3, further comprising:

a second inverter for generating an inverted input signal by inverting the input signal and providing the inverted input signal to the second electrode of the capacitor, wherein the second inverter includes a high potential power supply terminal for receiving the voltage of the high potential power supply and a low potential power supply terminal for receiving a voltage lower than the voltage of the high potential power supply, wherein the current limiting circuit includes a second PMOS transistor and a third inverter connected to a gate of the second PMOS transistor, wherein the third inverter includes a high potential power supply terminal for receiving the voltage of the high potential power supply and a low potential power supply terminal for receiving a voltage lower than the voltage of the high potential power supply, and wherein the third inverter generates an inverted input signal by inverting the input signal and provides the inverted input signal to the gate of the second PMOS transistor.

9. The level shift circuit according to claim 8, wherein the input signal has the voltage of the high potential power supply.

10. A level shift circuit comprising:

a capacitor;

a charge control circuit connected to the capacitor for providing a voltage of a high potential power supply to the capacitor and controlling charging of the capacitor; and a limiting circuit connected to the high potential power supply and the charge control circuit for stopping the voltage provided to the capacitor from the high potential power supply before the charge control circuit stops providing the voltage of the high potential power supply to the capacitor, wherein the charge control circuit includes an inverter, the low potential power supply terminal of which receives a voltage that, changes based on an input signal provided to the level shift circuit.

11. A level shift circuit comprising:

a capacitor;

a charge control circuit connected to the capacitor for providing a voltage of a high potential power supply to the capacitor and controlling charging of the capacitor; and a limiting circuit connected to the high potential power supply and the charge control circuit for stopping the voltage provided to the capacitor from the high potential power supply before the charge control circuit stops providing the voltage of the high potential power supply to the capacitor, wherein the charge control circuit includes an inverter which outputs a voltage changing between a first voltage level and a second voltage level and wherein the second voltage level is larger than the first voltage level and the voltage of the high potential power supply.

* * * * *